United States Patent
Schmitt et al.

(10) Patent No.: US 9,121,955 B2
(45) Date of Patent: Sep. 1, 2015

(54) SINGLE PHOTON COUNTING DETECTOR SYSTEM HAVING IMPROVED COUNTER ARCHITECTURE

(75) Inventors: Bernd Schmitt, Lauchringen (DE); Anna Bergamaschi, Baden (CH); Aldo Mozzanica, Windisch (CH); Roberto Dinapoli, Brugg (CH)

(73) Assignee: Paul Scherrer Institut, Villigen/PSI (CH)

( * ) Notice: Subject to any disclaimer, the term of this patent is extended or adjusted under 35 U.S.C. 154(b) by 93 days.

(21) Appl. No.: 13/985,961

(22) PCT Filed: Dec. 29, 2011

(86) PCT No.: PCT/EP2011/074237
§ 371 (c)(1),
(2), (4) Date: Nov. 27, 2013

(87) PCT Pub. No.: WO2012/110162
PCT Pub. Date: Aug. 23, 2012

(65) Prior Publication Data
US 2014/0166861 A1    Jun. 19, 2014

(30) Foreign Application Priority Data

Feb. 16, 2011 (EP) .................................. 11154622

(51) Int. Cl.
*G01T 1/29* (2006.01)
*G01T 1/24* (2006.01)
(Continued)

(52) U.S. Cl.
CPC . *G01T 1/29* (2013.01); *G01T 1/247* (2013.01); *H04N 5/32* (2013.01); *H04N 5/37455* (2013.01)

(58) Field of Classification Search
CPC ........... G01T 1/29; G01T 1/243; G01T 1/247; G01J 1/44; H04N 5/37455; H04N 5/32; H04N 5/378; H01L 27/14643; H01L 27/1446
See application file for complete search history.

(56) References Cited

U.S. PATENT DOCUMENTS 5,475,225 A * 12/1995 Stettner .................... 250/370.11
5,665,959 A * 9/1997 Fossum et al. ............. 250/208.1
(Continued)

FOREIGN PATENT DOCUMENTS

EP      1788629 A1    5/2007
JP      S6275371 A    4/1987
(Continued)

OTHER PUBLICATIONS

Perenzoni, M., et al., "A Multispectral Analog Photon-Counting Readout Circuit for X-ray Hybrid Pixel Detectors", IEEE Transactions on Instrumentation and Measurement, Jul. 2008, pp. 1438-1444, vol. 57, No. 7.
(Continued)

*Primary Examiner* — John Lee
(74) *Attorney, Agent, or Firm* — Laurence A. Greenberg; Werner H. Stemer; Ralph E. Locher

(57) ABSTRACT

A single photon counting detector system has a layer of photosensitive material and an N×M array of photo-detector diodes. Each photo-detector diode has a bias potential interface and a diode output interface. The bias potential interface is connected to bias potential. An N×M array of high gain, low noise readout unit cells is provided, one readout unit cell for each photo-detector diode. Each readout unit cell has an input interface connected to the diode output interface, a high-gain voltage amplifier with an integration capacitor at least two parallel lines of digital counters, each having a comparator with an individually selectable threshold and a gateable section to determine the counting intervals of the digital counters. A multiplexer allows access to the readout cell unit either on a per pixel basis or for several pixels in parallel to read out the digital counter to a data processor transferring the data off chip.

10 Claims, 3 Drawing Sheets

(51) Int. Cl.
*H04N 5/32* (2006.01)
*H04N 5/3745* (2011.01)

(56) References Cited

U.S. PATENT DOCUMENTS

| | | | |
|---|---|---|---|
| 6,248,990 B1 * | 6/2001 | Pyyhtia et al. | 250/208.1 |
| 6,362,482 B1 * | 3/2002 | Stettner et al. | 250/370.08 |
| 6,362,484 B1 * | 3/2002 | Beyne et al. | 250/374 |
| 6,552,319 B2 * | 4/2003 | Pyyhtia et al. | 250/208.1 |
| 6,552,745 B1 * | 4/2003 | Perner | 348/308 |
| 7,514,688 B2 * | 4/2009 | Broennimann et al. | 250/370.11 |
| 7,615,755 B2 * | 11/2009 | Coello et al. | 250/370.09 |
| 7,829,860 B2 * | 11/2010 | Nygard et al. | 250/370.09 |
| 7,868,665 B2 * | 1/2011 | Tumer et al. | 327/70 |
| 8,039,784 B2 | 10/2011 | Schmitt | |
| 8,159,379 B2 * | 4/2012 | Ritt et al. | 341/122 |
| 8,766,198 B2 * | 7/2014 | Dinapoli et al. | 250/370.01 |
| 9,069,081 B2 | 6/2015 | Campbell et al. | |
| 2004/0029119 A1 * | 2/2004 | Nurmi | 435/6 |
| 2006/0071170 A1 * | 4/2006 | Broennimann et al. | 250/370.09 |
| 2006/0261996 A1 * | 11/2006 | Augusto et al. | 341/155 |
| 2008/0191139 A1 | 8/2008 | Coello et al. | |
| 2009/0039273 A1 * | 2/2009 | Tkaczyk et al. | 250/370.06 |
| 2009/0057562 A1 * | 3/2009 | Heijne et al. | 250/370.07 |
| 2009/0285352 A1 * | 11/2009 | Schmitt | 377/54 |
| 2009/0290680 A1 * | 11/2009 | Tumer et al. | 378/62 |
| 2010/0020924 A1 * | 1/2010 | Steadman Booker et al. | 378/19 |
| 2010/0051823 A1 * | 3/2010 | Brenner et al. | 250/389 |
| 2010/0086100 A1 * | 4/2010 | Steadman et al. | 378/19 |
| 2010/0116999 A1 * | 5/2010 | Tumer et al. | 250/370.13 |
| 2010/0181491 A1 * | 7/2010 | Karim et al. | 250/394 |
| 2010/0270472 A1 * | 10/2010 | Proksa et al. | 250/371 |
| 2010/0316184 A1 * | 12/2010 | Iwanczyk et al. | 378/19 |
| 2010/0329425 A1 * | 12/2010 | Guo et al. | 378/91 |
| 2011/0042573 A1 * | 2/2011 | Kim et al. | 250/370.01 |
| 2011/0127415 A1 * | 6/2011 | Kanter | 250/252.1 |
| 2011/0155899 A1 * | 6/2011 | Dror et al. | 250/252.1 |
| 2011/0297836 A9 * | 12/2011 | Heijne et al. | 250/370.07 |
| 2012/0056078 A1 * | 3/2012 | Eldesouki et al. | 250/214 DC |
| 2012/0057059 A1 * | 3/2012 | Eldesouki et al. | 348/302 |
| 2012/0057152 A1 * | 3/2012 | Eldesouki et al. | 356/226 |
| 2012/0161016 A1 * | 6/2012 | Schmitt | 250/370.06 |
| 2013/0105701 A1 * | 5/2013 | Han et al. | 250/394 |
| 2014/0166861 A1 * | 6/2014 | Schmitt et al. | 250/208.2 |

FOREIGN PATENT DOCUMENTS

| | | |
|---|---|---|
| JP | H0373882 A | 3/1991 |
| JP | 2002168958 A | 6/2002 |
| JP | 2010507797 A | 3/2010 |
| JP | 2010536021 A | 11/2010 |

OTHER PUBLICATIONS

Szczygiel, R., et al., "RG64—High Count Rate Low Noise Multichannel ASIC With Energy Window Selection and Continuous Readout Mode", IEEE Transactions on Nuclear Science, Apr. 2009, pp. 487-495, vol. 56, No. 2.

Loecker, M., et al., "Single photon counting X-ray imaging with Si and CdTe single chip pixel detectors and multichip pixel modules", IEEE Transactions on Nuclear Science, Aug. 2004, pp. 1717-1723, vol. 51, No. 4, URL: http://arxiv.org/ftp/physics/papers/0312/0312070.pdf.

Carini, G.A., et al., "XAMPS prototypes for the X-ray Pump Probe instruments at the LCLS", IEEE Nuclear Science Symposium Conference Record, Oct. 19-25, 2008, Dresden, Germany, pp. 1572-1577.

* cited by examiner

SINGLE PHOTON COUNTING DETECTOR SYSTEM HAVING IMPROVED COUNTER ARCHITECTURE

BACKGROUND OF THE INVENTION

Field of the Invention

The present invention relates to a single photon counting detector system having an improved counter architecture.

The present subject matter describes the read out chips and parts of the detector systems for x-ray applications at synchrotrons or with lab equipment (lab diffractometers) in material sciences, crystallography, non destructive testing and medical applications. The energy of the photons to be detected ranges roughly from about 0.1 to 150 keV.

The detectors are hybrid detectors comprising an x-ray sensitive layer (silicon sensor) and readout chips. In case of 2-dimensional detectors (pixel detectors) each pixel in the sensor is directly connected (bump bonding or flip chip bonding) to the corresponding pixel in the readout chip. The pixel size is therefore limited by the pixel size in the readout chip, and the number of electronic components per pixel in the readout chip is therefore rather limited as to find a suitable pay-off between the pixel size and capabilities of the electronics in the readout chip. In case of microstrip detectors the sensors are usually wire bonded to the readout chip and space is usually limited in the direction perpendicular to the strips. Pixel detectors and strip detectors of that kind are disclosed in the International Patent Application WO 2004/064 168 A1 which is incorporated herewith by reference.

The readout chip contains n (either 1- or 2 dimensional) independently working channels. Each channel has a charge sensitive preamp, gain stages and a counter. Each channel can count single photons independently of the other channels. An image requires two phases: 1) acquisition mode (where the counters count the incoming photons) and 2) readout mode (where the counting is disabled and the number of counts per channel are read out). The readout can overlap the acquisition.

The largest current problems are:

i) For high incoming photon rates (500 KHz to 3 MHz) the analogue signal starts to pile up and counts get lost. The measured rate therefore has to be corrected (rate correction). Above 3 MHz single photon counting systems as implemented today are basically not usable anymore. This is specifically for protein crystallography a problem. Due to the pixel to pixel variations in the effective parameters of the transistors there are also pixel to pixel variations of the shaping time. Since the rate correction measurements are quite difficult, they are made for an average shaping time of all the pixels. Therefore, the shaping time correction can only slightly extend the linear counting region as a function of the incoming photon rate.

ii) For pump and probe measurements a sample is excited (pumped) and then after a selectable time the counting is enabled for a short period (probe). This is then repeated as often as required for the collection of the statistics and only then read out. Since usually the conditions are not constant or the sample degrades (e.g. tensile tests or fatigue measurements in powder diffraction) it is necessary to make (at least) 2 measurements quasi simultaneously (usually pumped and unpumped). This is currently not possible at high repetition rates of the pump signal since the counts can only be accumulated in a single counter per pixel making a readout for each probe interval and an offline summation of the pumped and unpumped intervals necessary. Since for the pump and probe measurements the statistic is usually very limited the pump repetition rate needs to be maximized which prevents a readout for each interval (both pumped and unpumped). Also for rapidly changing systems the possibility of reading the detector out for each probe interval is not always given.

BRIEF SUMMARY OF THE INVENTION

It is therefore an objective of the present invention to provide a single photon counting detector system that offers a high sampling rate and copes with the problem of fast changes of counting intervals, in particular in pump and probe measurements.

This objective is achieved according to the present invention by a single photon counting detector system, comprising:
 a) a layer of photosensitive material;
 b) an N×M array of photo-detector diodes arranged in said layer of photosensitive material; each of said photo-detector diodes having a bias potential interface and a diode output interface, said bias potential interface of each photo-detector diode being connected to a bias potential;
 c) an N×M array of high gain, low noise readout unit cells, one readout unit cell for each photo-detector diode;
 d) each readout unit cell comprising:
  d1) an input interface connected to said diode output interface, a high-gain voltage amplifying means comprising an integration capacitor,
  d2) at least two parallel lines of digital counters,
  d3) each line comprising a comparator having an individually selectable threshold and an individually gateable section which determines the counting intervals for each line of the digital counters.
 e) a multiplexing means allowing to access the readout cell unit either on a per pixel basis or for several pixels in parallel to read out the digital counter to a data processing means transferring the data off the chip to the data processing means, in particular external readout electronics which do not form an integral part of the readout unit cells.

This detector system overcomes the limitations for pump and probe measurements of todays single photon counting systems. By having more than two independently gateable digital counters it is now possible to measure (probe) at different times during the relaxation of the system (one fixed selectable time for each of the counters). This last option is specifically interesting for measurements with a continuous beam, like pump and probe measurements in powder diffraction.

In todays single photon counting detector systems, the problem of pile-up of the analogue signal at high incoming photon rates is an unsolved problem. In a preferred embodiment of the present invention, the individually selectable threshold helps to mitigate or completely eliminate the pile-up problem when at least two thresholds are set-up to have one threshold on a level below the photon energy, e.g. about half of the photon energy, and at least another threshold on a level above the beam energy, e.g. about 1.5-times the photon energy. The counter at the lower level, e.g. half the beam energy, is the standard counter as used in todays systems. The counter at the upper level, e.g. 1.5 times the beam energy, counts only the pulses where two photons arrived so close in time that the pulse of the second photon arrived during the pulse of the first photon and the total analogue signal did not fall below the comparator threshold (half the beam energy) in between the photons causing a pulse height of above 1.5 times the photon energy. By adding the number of counts for the two counters the count rate capability is increased by about a factor of 2 which is a significant improvement.

As already mentioned further above, the handling of pump and probe measurements have been a serious problem with todays single photon counting detector systems. The detector system according to the present invention may be adapted for the purpose when the gateable sections are controllable in order to be adapted to pump and probe measurements, wherein for a determined number of readout unit cells the hits during a pump phase are counted in one digital counter and the hits during a probe phase are counted in another digital counter. When talking about a determined number of readout unit cells, in most of the applications all readout unit cells are addressed but there are envisionable examples that may require only subgroups of the readout unit cells having the gateable sections controlled accordingly, such as subgroups in a region of interest.

A further preferred embodiment of the present invention can be achieved when for a determined number of readout unit cells at least two thresholds are set-up to build a window discriminator thereby having one threshold to be set to the lower edge of the window and another threshold to be set to the upper edge of the window. For photon intensities which do not cause pile up, this kind of a dual digital counter enables to count the number of photons having an energy within the energy window by subtracting from the number of counts of the lower threshold the number of counts of the higher threshold. This mode of usage is mainly interesting outside of pump and probe experiments for measurements with x-ray tubes (i.e. laboratory diffractometers) which have a wider energy spectrum where the higher energies contribute only to the background which can be cut-off by using only photons within a window. At synchrotron, for some applications, like e.g. Laue diffraction, which have a certain energy range of the photons, it might also be advantageous to count photons only in a certain energy window.

Another preferred embodiment of the present invention can be achieved when the gate sections are gateable with a fixed frequency signal, preferably an count enable signal which is run with a fixed frequency of e.g. 10 to 200 MHz, with the output of the comparator thereby counting the pulses of the fixed frequency signal only when the analogue signal at the output of the high gain voltage amplifying means is above the threshold which is set-up for the respective comparator. This is the so-called time over-threshold-mode where the counter measures the time during which the analogue signal was above the comparator threshold during the acquisition time. For signals with pile up of 2 photons (as explained above) the time during which the signal is above the comparator threshold is longer and the time-over-threshold measurement mode determines exactly this circumstance. The measured time then can be converted into the number of photons. Having the count rate in single photon counting mode from the first counter allows immediately the determination of the conversion from time over threshold mode to single photon counting mode for low count rates, i.e. the calibration of the time-over-threshold counter with the single photon counter. This allows to extend the count rate capability of single photon counting systems at synchrotrons to a level where pile up is not a problem anymore.

Further preferred embodiments of the present invention can be taken from the remaining depending claims.

Preferred embodiments of the present invention are hereinafter discussed in more detail with reference to the following drawings which depicts in:

DESCRIPTION OF THE INVENTION

Figure 1:
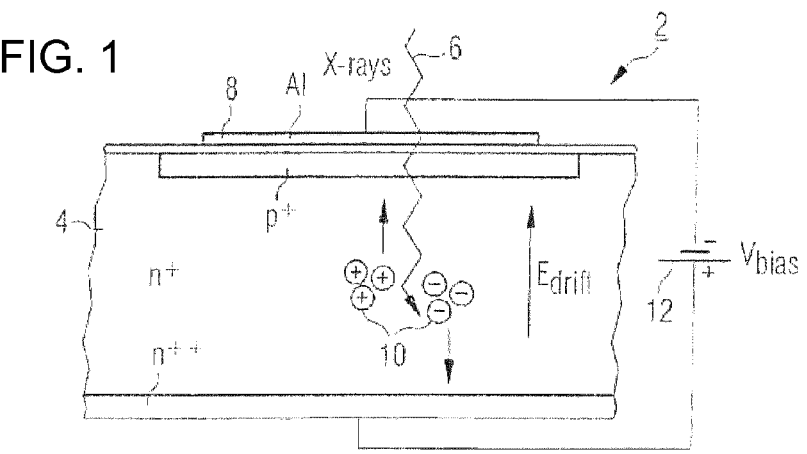
FIG. 1 a schematic view of the design of a photo-detector diode.

FIG. 1 illustrates schematically the architecture of a photo-detector diode 2 having a doped semiconductor $p^+$, $n^-$, $n^{++}$ trespassing section 4. The most commonly used material is a silicon crystal but also germanium, gallium arsenide or cadmium telluride are used.

An incident photon 6 having an energy in the range of 100 eV to several KeV before entering the doped semiconductor $p^+$, $n^-$, $n^{++}$ trespassing section 4 passes through a possible cover layer (e.g. aluminum) 8 and causes according to its energy and to the energy needed to create an electron hole pair a respective number of electron hole pairs 10 after x-ray absorption. In the drawings, this number of electron hole pairs is exemplarily shown by three electron-hole pairs 10 being divided by the electrical field generated by a source of bias potential 12.

Figure 2:
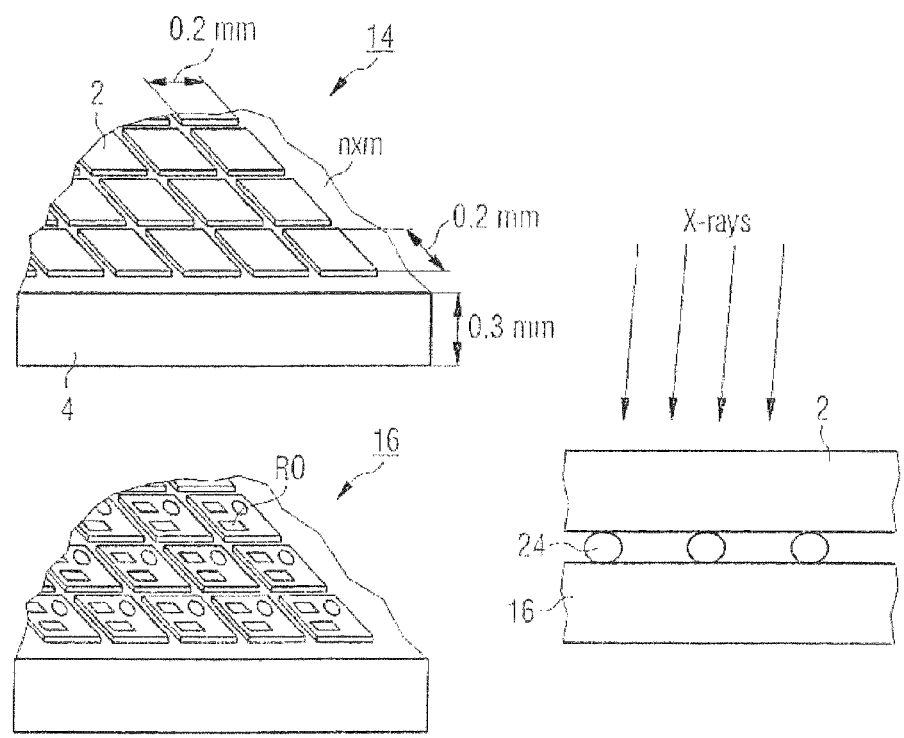
FIG. 2 a schematic view of a part of a detector module comprising an array of photo-detector diodes as one of them is shown in FIG. 1.

FIG. 2 shows a schematic view of a two-dimensional pixel detector 14 having a number of photo-detector diodes 2 arranged in an array of n rows and m columns. The photo detector diodes 2 have a length l and a width w of about 25-200 µm and a height of about 200 µm to 2 mm. Below the plane of these photo-detector diodes 2 a readout chip 16 having a corresponding number of readout unit cells RO is arranged for collecting the charge from the electron hole pairs 10 generated in the respective photo-detector diodes 2. The electrical conjunction between a diode output interface of the photo-detector diodes 2 and an input interface IN of the readout unit cell RO is achieved by bump bonding using for example indium bumps 24.

Figure 3:
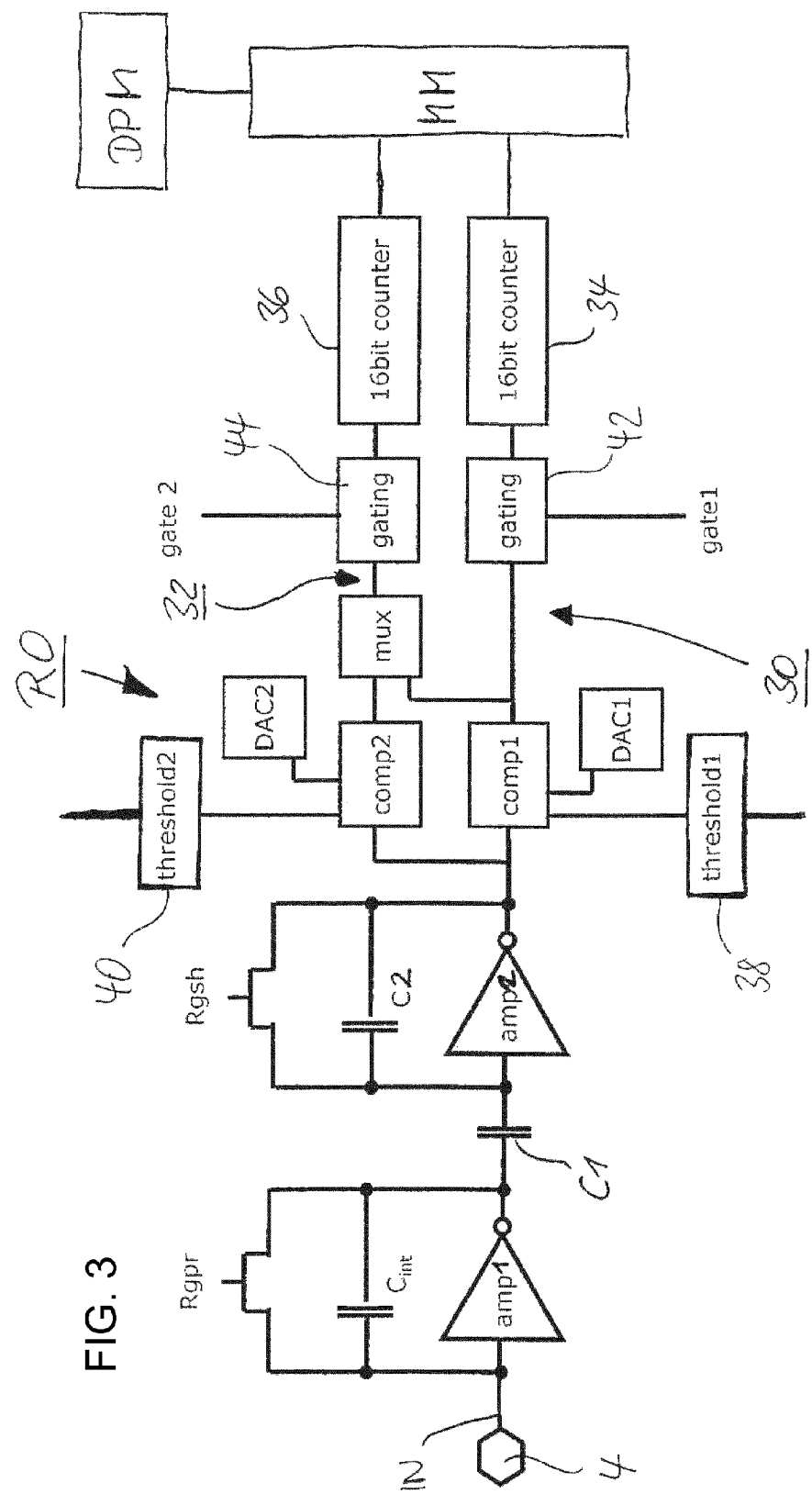
FIG. 3 a schematic view of a design of a readout cell comprising two gateable digital counters.

FIG. 3 illustrates schematically the design of a readout unit cell RO comprising two lines 30, 32 of digital counters 34, 36. The charge generated in the photo detector diode 2 by the x-ray is amplified by a low noise charge sensitive amplifier amp1 where the charge is integrated on the integration capacitance $C_{int}$. A feedback resistor who's value can be changed by the voltage applied to Rgpr discharges the capacitor, therefore, forming a pulse at the input of the capacitor C1. The amplifier amp2 then further amplifies the signal with a gain given by the ration of C1/C2. The signals Rgpr and Rgsh change the value of the feedback resitors therefore influencing the discharge time (shaping) and the gain of the amplifiers amp1 and amp2. The analogue pulse at the output of amp2 is then feed in parallel into the comparators comp1 and comp2. Comp1 and comp2 in all readout cells on a chip have in general the same comparator threshold voltages threshold1 and threshold2 respectively. An individual threshold per cell fine tuning (adjustment) can be done with the help of the per cell programmable digital to voltage converters DAC1 and DAC2 allowing to increase the uniformity of the effective threshold fluctuations caused by variations in the transistor parameters on the chip. The comparators comp1, comp2 each belong to one line 30, 32 of digital counters 34, 36. For pump and probe measurements the two counters 34, 36 per channel are independently gateable by gateable sections 42, 44. One counter 34 measures the pumped and the other counter 36 the unpumped state of pump and probe measurements. This overcomes the limitations for pump and probe measurements of todays single photon counting systems.

Due to the large number of counter cells in a readout chip and the limited number of readout pins the counter values are usually read out sequentially such that the multiplex means MM transverse the data of the selected counter to the data processing means which might further serialize the data of the selected counter. The readout chip can have several multiplexing data processing means working in parallel thus increasing the readout speed.

Figure 4:
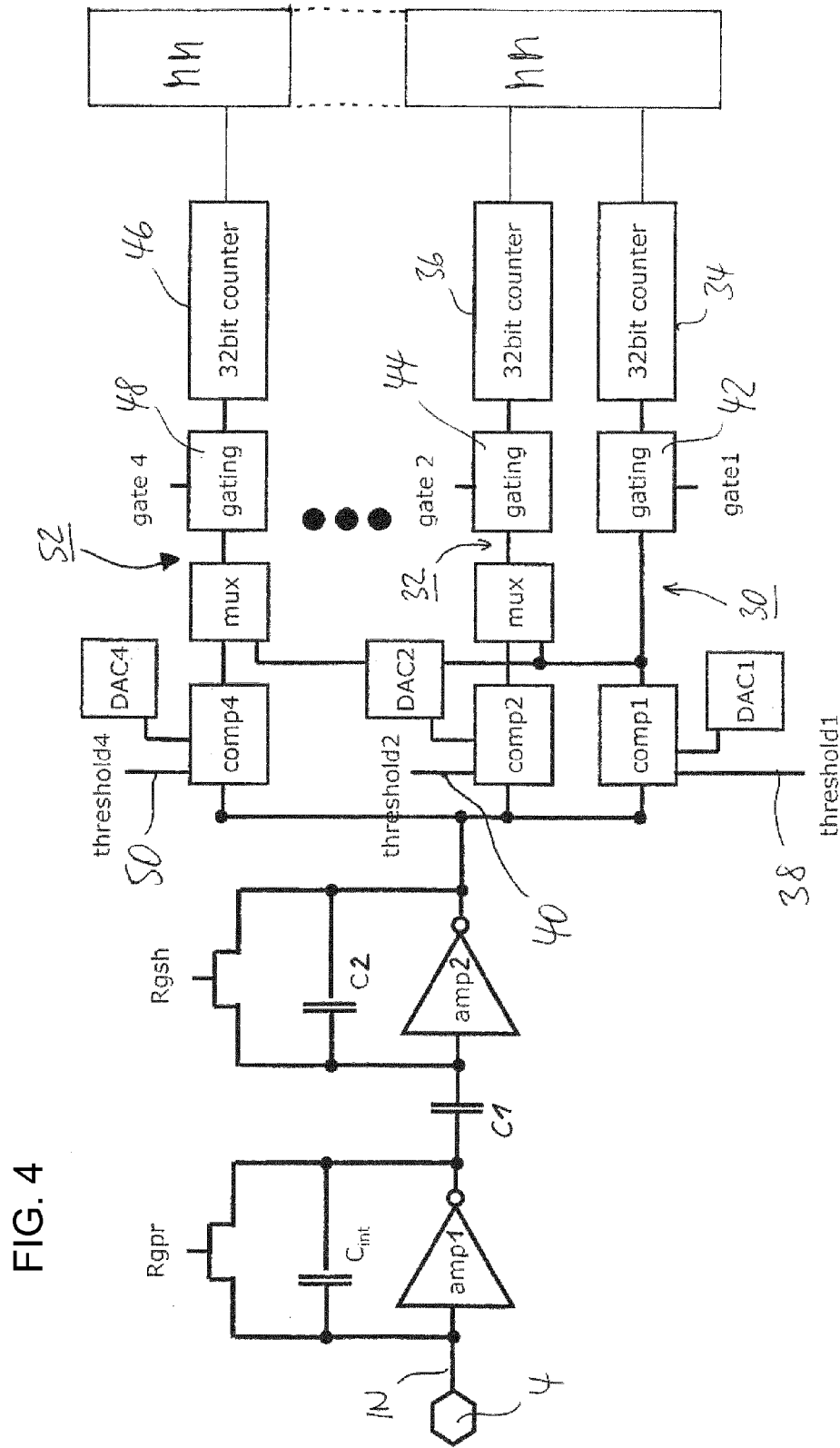
FIG. 4 a schematic view of a design of a readout cell comprising four gateable digital counters.

Having more than two independently gateable counters 34, 36, 46 (see FIG. 4) also allows to measure (probe) at different times during the relaxation of the system (one fixed selectable time for each of the counters). This last option is specifically interesting for measurements with a continuous beam, like pump and probe measurements in powder diffraction and is shown in FIG. 4.

Having two or more counters 34, 36, 46 also allows to measure the pile-up of the analogue signal by using for one counter 34 a first threshold 38 of half the beam energy (standard value) and for the second counter 36 a second threshold 40 of 1.5 times the beam energy. The counter 34 at half the beam energy is the standard counter as used in todays systems. The second counter 36 at 1.5 times the beam energy counts only the pulses where two photons arrived so close in time that the pulse of the second photon arrived during the pulse of the first photon and the total analogue signal did not fall below the comparator threshold 38 (half the beam energy) in between the photons causing a pulse height of above 1.5 times the photon energy. By adding the number of counts for the two counters the count rate capability is increased by about a factor of 2 which is a significant improvement.

Further, having two (or more) counters allows to operate the first counter 34 in standard operation mode (single photon counting) and the second counter 36 in time over threshold mode. In time over-threshold-mode, the second counter 36 measures the time during which the analogue signal was above the threshold 40 during the acquisition time. These measurements can easily be done by gating a fixed frequency signal (this can for example be the count enable signal which is run with a fixed frequency of e.g. 10 to 200 MHz) with the output of the comparator comp2, i.e. counting the pulses of the fixed frequency signal only when the analogue signal is above the threshold 40. For signals with pile up of two photons (as above) the time during which the signal is above threshold is longer and the time-over-threshold measurement measures this. The measured time then can be converted into the number of photons. Having the count rate in single photon counting mode from the first counter 34 allows immediately the determination of the conversion from time-over-threshold mode to number of photons (i.e. single photon counting mode) for low count rates, i.e. the calibration of the time-over-threshold counter (second counter 36) with the single photon counter (first counter 34). This allows to extend the count rate capability of single photon counting systems at synchrotrons to a level where pile up is not a problem anymore.

For intensities which do not cause pile up, a dual counter system will also be usable as window discriminator, by subtracting from the number of counts of the lower threshold the number of counts of the higher threshold.

A multi counter system can also be designed in such a way that one counter can be read out while an other counter acquires data. This allows a dead-time free operation of the system since data can continuously be acquired as illustrated in FIG. 4.

A possible option for all single photon counting systems is an active reset of the preamp. The preamp would be reset (i.e. the analogue pulse be cut-off) if the analogue signal is above threshold. This shortens the pulse width of the analogue signal, therefore again increasing the count rate capability.

The invention claimed is:

1. A single photon counting detector system, comprising:
   a) a layer of photosensitive material;
   b) an N×M array of photo-detector diodes arranged in said layer of photosensitive material, each of said photo-detector diodes having a bias potential interface and a diode output interface, said bias potential interface of each of each of said photo-detector diode being connected to a bias potential;
   c) an N×M array of high gain, low noise readout unit cells, one of said readout unit cells for each one of said photo-detector diodes;
   d) each readout unit cell having:
      d1) an input interface connected to said diode output interface, a high-gain voltage amplifier with an integration capacitor, said high-gain voltage amplifier connected to said input interface;
      d2) at least two parallel lines of digital counters;
      d3) each of said lines including a comparator connected to obtain an output signal from said high-gain voltage amplifier, said comparator having an individually selectable threshold, each of said lines including a gateable section for determining a counting interval of said digital counters individually for each line of digital counters, said gateable section configured for gating a fixed frequency signal with an output of said comparator; and
   e) a multiplexer device connected to said digital counters to allow access to said readout cell unit either on a per pixel basis or for a plurality of pixels in parallel to read out data from said digital counters to a data processor.

2. The detector system according to claim 1, wherein the data is transferred to external readout electronics which do not form an integral part of the readout unit cells.

3. The detector system according to claim 1, wherein at least two thresholds are defined to have one threshold on a level of substantially half of a photon energy and at least another threshold on a level of substantially 1.5 times the photon energy.

4. The detector system according to claim 1, wherein said gateable section is configured to be controllable in order to be adapted to pump and probe measurements, wherein for a determined number of readout unit cells, hits occurring during a probe phase are counted in one of said digital counters and hits occurring during another probe phase are counted in another one of said digital counters.

5. The detector system according to claim 4, wherein for all of the readout unit cells, hits occurring during a pumped probe phase are counted in the one of said digital counters and hits occurring during an unpumped probe phase, without pumping of a sample, are counted in another one of said digital counters.

6. The detector system according to claim 1, wherein for a determined number of readout unit cells at least two thresholds are set-up to build a window discriminator thereby having one threshold to be set to a lower edge of the window and another threshold to be set to an upper edge of the window.

7. The detector system according to claim 1, wherein said gateable section is configured to count pulses of the fixed frequency signal only when an analog signal at said output of said high gain voltage amplifier lies above a threshold set up for said comparator.

8. The detector system according to claim 7, wherein said gateable section is gateable at a count enable signal run with a fixed frequency between 10 to 200 MHz.

9. The detector system according to claim 1, wherein said multiplexer and said data processor are configured to allow the readout of one line of counters while the respectively other line of counters is used for the next acquisition of data.

10. The detector system according to claim 1, wherein said charge integrating amplifier is individually reset for each cell by the cell's comparator if the signal at the comparator input is above the comparator threshold.

* * * * *